United States Patent [19]

Hogarth et al.

[11] Patent Number: 5,117,122

[45] Date of Patent: May 26, 1992

[54] INTEGRATED OUTLET FOR COMMUNICATION AND ELECTRICAL POWER TRANSMISSIONS WITH NOISE REDUCING CHARACTERISTICS

[76] Inventors: Peter T. Hogarth, P.O. Box 1235, 206 N. 5th St., Fairfield, Iowa 52556; Kurt Swenson, 697 Beth La., Lexington, Ky. 40503; Charles E. Gutenson, 2774 Ginger View La.; Edward L. Nichols, III, 107 Cranes Crook La., both of Annapolis, Md. 21401; Lincoln E. Roberts, 643 Pinetree Dr., Decatur, Ga. 30030; Vernon R. Miller, 1148 Morningside Pl. N. E., Atlanta, Ga. 30306

[21] Appl. No.: 464,130

[22] Filed: Jan. 16, 1990

Related U.S. Application Data

[63] Continuation-in-part of Ser. No. 299,192, Jan. 19, 1989.

[51] Int. Cl.⁵ .................. H01R 9/07; H01R 13/70; H02J 3/02
[52] U.S. Cl. .................. 307/140; 174/53; 307/40; 307/147; 333/260; 361/172; 375/36; 379/397; 439/535; 439/540; 439/620
[58] Field of Search .................. 307/1-3, 307/18-22, 25, 26, 28, 38-43, 51, 72-76, 85, 86, 112-116, 140, 141, 147, 155; 439/653, 654, 535, 620, 540, 555, 639; 174/53-55; 333/1, 100, 260; 375/36; 379/387, 332; 340/310 R, 310 A, 310 CP, 825.06-825.09, 825.22; 220/3.2-3.94; 361/331, 172

[56] References Cited

U.S. PATENT DOCUMENTS

| | | | |
|---|---|---|---|
| 4,215,276 | 7/1980 | Janeway | 307/40 |
| 4,418,333 | 11/1983 | Schwarzbach et al. | 340/310 A |
| 4,538,073 | 8/1985 | Freige et al. | 307/33 |
| 4,636,914 | 1/1987 | Belli | 361/331 |
| 4,758,536 | 7/1988 | Miller et al. | 439/138 |
| 4,870,863 | 10/1989 | Duncan et al. | 73/431 |

Primary Examiner—A. D. Pellinen
Assistant Examiner—David Osborn

[57] ABSTRACT

The present invention relates to an integrated outlet that allows supply of AC power to an outlet receptacle when certain conditions are satisfied. The integrated outlet contains separate modules to establish electrical connection with electrical conductors that transmit AC and DC power, telecommunications, control communications, and signals transmitted along a coaxial wire. In a preferred embodiment, these electrical conductors are disposed on two cables. Each module within the integrated outlet attaches to only certain standard conductors in each of the two cables. The integrated outlet can then be efficiently connected to the conductors in each of the two cables.

10 Claims, 7 Drawing Sheets

INTEGRATED OUTLET FOR COMMUNICATION AND ELECTRICAL POWER TRANSMISSIONS WITH NOISE REDUCING CHARACTERISTICS

BACKGROUND OF THE INVENTION

This application is a continuation-in-part of U.S. patent application Ser. No. 07/299,192 filed Jan. 19, 1989.

1. The Field of the Art

The present invention relates to an integrated outlet that allows external appliances to be attached to electrical power and communications lines.

2. Description of the Prior Art

Various types of outlets are known for establishing electrical connection with AC and DC power. Similarly, outlets are known for establishing communications with digital communications lines.

In order to make installation of wiring in homes simpler, it has been proposed to install a cable having a multitude of conductors that can supply both electrical power and communications signals to various parts of a building, such as a house. In order to access the power and communications signals that are transmitted along a cable such as this, a special type of outlet is necessary.

An example of one type of proposed outlet exists in U.S. Pat. No. 4,758,536. This outlet provides a simple way of establishing an electrical connection to a ribbon cable containing various conductors that transmit both power and communications signals. However, this outlet only provides a simple connection, so that an external device can be connected to the receptacles. Thus, the 120V AC or 240 V AC power that is transmitted along the line is also always transmitted to the receptacle. Thus, because the power receptacle is always "hot", an electrical short can easily occur.

Furthermore, it is necessary to attach many appliances, switches and sensors directly to the cable containing power and communications conductors rather than through an external receptacle in a convenient and standardized format.

Thus a new outlet that can establish electrical connections in various ways to a cable having both power and communications conductors is necessary.

SUMMARY OF THE INVENTION

It is an object of the present invention to provide an integrated outlet that establishes electrical connection to a cable containing a plurality of conductors and transmits electrical power and communications signals.

It is another object of the present invention to provide an integrated outlet that maintains closed loop AC power to ensure safety of the system.

It is a further object of the present invention to provide a plurality of standardized modules insertable into the integrated outlet that can establish connection between various conductors on the ribbon cable.

It is still a further object of the invention to provide uninterruptable 5V DC power to each of the standardized modules in the integrated outlet.

It is still a further object of the present invention to provide an integrated outlet that establishes electrical connections with conductors on two ribbon cables containing predetermined types of wires for eas of installation and connection of the various electrical conductors.

In order to attain the above recited objects of the invention, among others, the integrated outlet of the present invention has a lighting power module, a switch/sensor module, a duplex power and communications module, and an uninterruptable power supply module, that all are attached to a tap that surrounds a cable, preferably a ribbon cable, containing the power and communications conductors. A coaxial tap provides connection to a coaxial cable on this cable having a plurality of conductors.

Placement of the integrated outlet at many locations in a building is possible and multiple integrated outlets can be connected to the same ribbon cable.

The lighting power module accesses AC and DC power and communications signals to a separate ribbon cable that can be run to a location external from the integrated outlet. The switch/sensor module accesses communications signals and DC power, but not AC power, to a separate ribbon cable that can be run to a location external from the integrated outlet. The duplex power and communications module contains external receptacles for attachment of appliances to AC power, communications, and telecommunications. The uninterruptable power supply module supplies 5V DC power to each of the other modules in the integrated outlet.

Thus, these standardized modules allow the transmission of electrical power and communications in a variety of different ways from an integrated outlet. Thus, a safe, economical, and cost effective device is obtained.

In another embodiment, the integrated outlet can contain a modified duplex power and communication module, a modified lighting power module, the coaxial top, as well as a separate telephone module. The placement of these modules allows for easy installation of the integrated outlet and connection of the various electrical conductors.

BRIEF DESCRIPTION OF THE DRAWINGS

These and other advantages of the present invention may be appreciated from studying the following detailed description of the preferred embodiment together with the drawings in which.

DETAILED DESCRIPTION OF THE PREFERRED EMBODIMENT

Figures 1, 2:
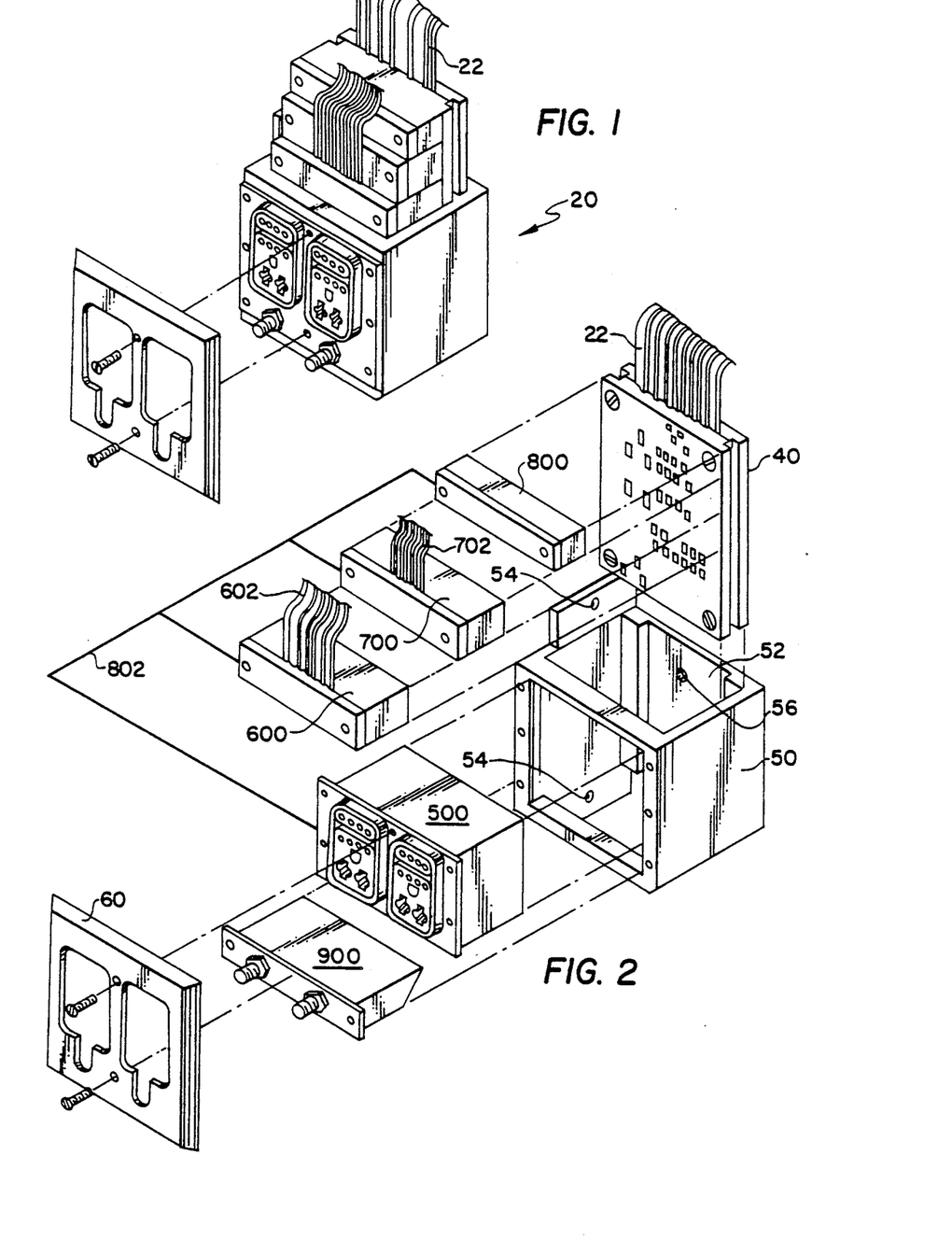
FIG. 1 illustrates a perspective view of the integrated outlet according to the present invention.
FIG. 2 illustrates an exploded perspective view the integrated outlet according to the present invention.

FIG. 1 illustrates a perspective view of integrated outlet 20, which is shown in exploded view in FIG. 2. Integrated outlet 20 provides a single unit that establishes electrical contact with power conductors such as 120V AC and 12V DC, communication conductors, telecommunication conductors, and coaxial conductors in a safe and efficient manner.

Figure 4:
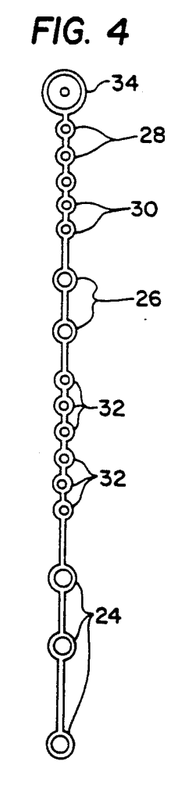
FIG. 4 illustrates a ribbon cable that can be used with the integrated outlet according to the present invention.

FIG. 4 illustrates ribbon cable 22 that is the preferred mode of transferring various types of electrical signals to integrated outlet 20. However, other combinations of separate conductor could be used to perform the equivalent function of ribbon cable 22. In the preferred embodiment of ribbon cable 22 shown in FIG. 4, three #14 gauge wires 24 provide 120V AC, 15 amp, power. However, if 120 V AC, 20 amp, power was required, a heavier wire could be used. If 240V AC power was wanted, one additional gauge wire 24 could be introduced. Two #18 parallel, untwisted gauge wires 26 provide 12V DC power. Telephone line 28 and telephone line 30 provide a conductive path for telecommunications along ribbon cable 22 and a shield wire is disposed between the telephone lines. Six control communications wires 32, made of #24 gauge untwisted copper wire provide a conductive path for digital control communications. Coaxial wire 34 can be used, for example, to transmit television signals along ribbon cable 22. These various wires are accessed by separate modules within integrated outlet 20, which will now be summarily described with reference to FIG. 2.

Tap 40 holds ribbon cable 22, and contains a plurality of pin insert holes 42. Duplex power and communications module 500, lighting power module 600, switch/sensor module 700, and uninterruptable power supply module 800 each contain pins, described in more detail hereinafter, that project into pin insert holes 42 and establish an electrical path to ribbon cable 22.

Uninterruptable power supply module 800 converts the 12V DC power that is supplied on parallel, untwisted gauge wires 26 into 5V DC power. This 5V DC power is supplied to switch/sensor module 700, lighting power module 600, and duplex power and communications module 500 along uninterruptable power line 802. This 5V DC power is necessary to operate communications transfer circuits, preferably in integrated circuit chip form, that exist within each of switch/sensor module 700, lighting power module 600, and duplex power and communications module 500.

In the preferred embodiment of the invention, uninterruptable power supply module 800 is in a physically separate housing from switch/sensor module 700, lighting power module 600, or duplex power and communications module 500. This keeps the 12V DC power supply in a confined area and prevents the introduction of additional noise in the other modules. The preferred embodiment also contains a single switch/sensor module 700, lighting power module 600, and duplex power and communications module 500, along with a coaxial tap 900 that outputs, for example, video signals that are transmitted along coaxial wire 34. However, not all of these modules must necessarily be installed in each integrated outlet 20, or more than one module could be installed in a particular integrated outlet 20. Thus, if only one module were used, for example, duplex power and communications module 500, the uninterruptable power supply module 800 could be located within the duplex power and communications module 500.

However, for safety reasons and also standardization, each of these modules are kept separate. Thus, if one of the modules fails, it is an easy matter to replace the single module with its standardized replacement.

Each of the modules will be described individually. Before this description, the supporting structure of integrated outlet 20 will be described.

FIG. 2 illustrates that enclosure 50. In use, enclosure 50 is initially attached to a wall stud using side holes 54 or to a wall using back holes 56. Once enclosure 50 is mounted, ribbon cable 22 can be inserted so that it passes through each enclosure 50. Enclosure 50 can be made of metal, molded plastic or some other material. Molded plastic is preferred to minimize the chance of an electrical short.

Figure 3A:
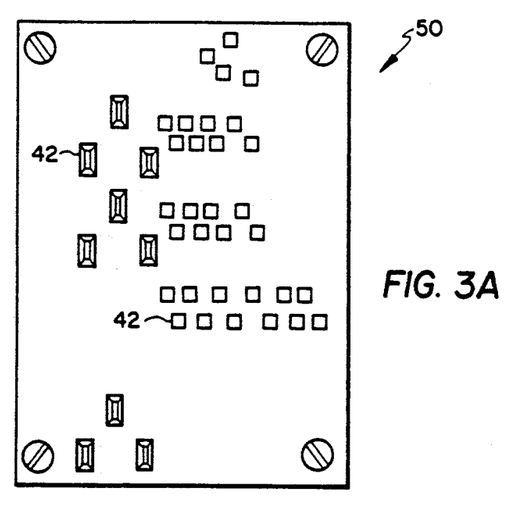
FIGS. 3A and 3B illustrate the tap of the integrated outlet according to the present invention.
Figure 3B:
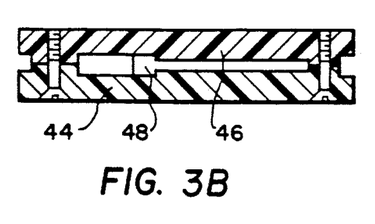

Tap 40, illustrated in FIGS. 3A and 3B, is made up of a front panel 44 and rear panel 46 that are connected by screws so that ribbon cable 22 fits into opening 48. Tap 40 is made of an insulating material. The various pin insert holes 42 have sizes that correspond to the cross sectional area of the pins that they will receive. One example of locations for pin insert holes 42 are shown in FIG. 3A. These locations correspond to the location of the module pins described in detail hereinafter.

Tap 40 slidably inserts into enclosure 50. Thus, after uninterruptable power supply module 800, switch/sensor module 700, lighting power module 600, or duplex power and communications module 500 are inserted into tap 40, their later removal from tap 40 is possible because tap 40 is firmly held in position. For example, tap 40 can be screwed into back wall 52 of enclosure 50. However, if tap 40 is defective for some reason, the various modules can be removed, it can be slid out of enclosure 50, and a new tap 40 can be placed on ribbon cable 22 and reinserted in enclosure 50.

FIG. 2 also shows that faceplate 60 is mounted with screws over the coaxial tap 900 and duplex power and communications module 500 to keep these modules, which will be exposed, within enclosure 50.

Figure 5A:
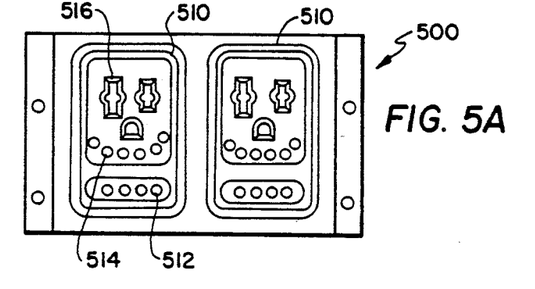
FIGS. 5A-5D illustrate the duplex power and communication module of the integrated outlet according to the present invention.
Figure 5B:
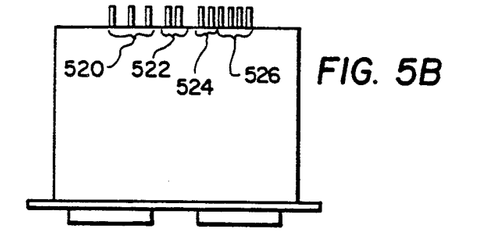
Figure 5C:
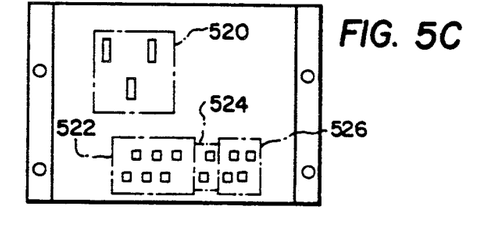

FIGS. 5A-5C show the front, top, and back views, respectively, of duplex power and communications module 500. The exterior of duplex power and communications module 500 is preferably made of an insulating material such as molded plastic. As shown in FIG. 5A, two receptacles 510 allow connection of an external appliance that requires electrical power, control communications, or telecommunications. On each receptacle 510 are telecommunications outlet 512, control communications outlet 514 and power outlet 516. Each outlet contains contacts that allow electrical contact between the appliance plug and the outlet. Various configurations of telecommunications outlet 512, control communications outlet 514, and power outlet 516 can be made.

FIG. 5B illustrates the various pin connections. Power pins 520 insert into pin insert holes 42 of tap 40 shown in FIG. 3A that correspond to the 120V AC conductors. Control communication pins 522 correspond to the pin insert holes 42 of tap 40 for control communications. DC power pins 524 correspond to the pin insert holes 42 of tap 40 for 12V DC power. Telecommunication pins 526 correspond to the pin insert holes 42 of tap 40 for telecommunications. FIG. 5C illustrates the location of the various pins from the back of duplex power and communications module 500.

Figure 5D:
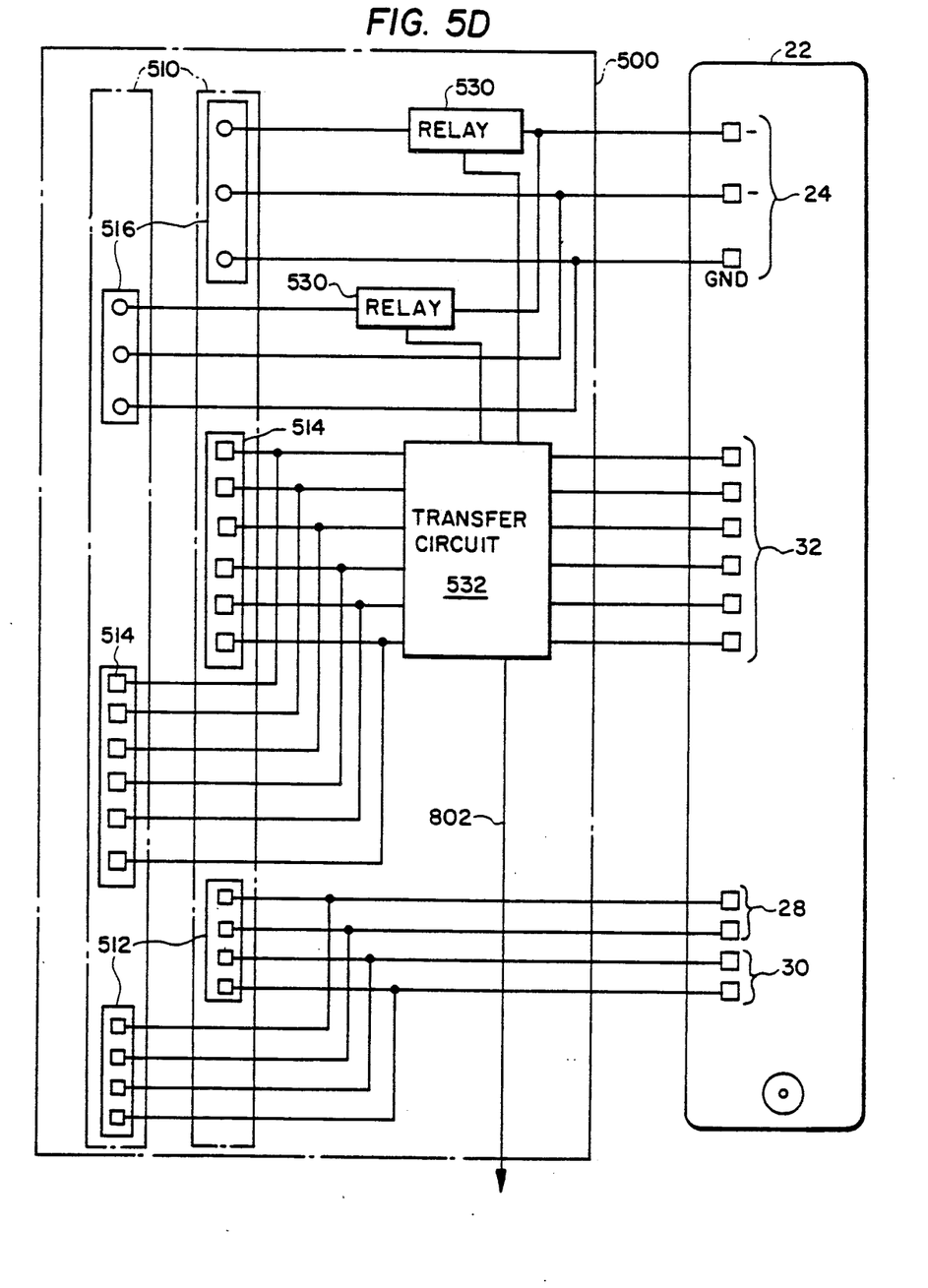

FIG. 5D illustrates the electrical paths that exist within duplex power and communications module 500 from ribbon cable 22 to receptacles 510 for transmission of the various signals. Conductive paths from gauge wires 24 to power outlet 516 do not exist until relay 530 closes. Relay 530 will typically be a mechanical relay that closes when it receives a predetermined command signal from a data transfer circuit 532, which is preferably an integrated circuit chip. This predetermined command signal could be generated, in a very simple form, for any appliance that has a plug. For example, the act of inserting the appliance plug into power outlet 516 could cause a command signal that would result in the generation of the predetermined command signal.

Data transfer circuit 532 receives power from uninterruptable power supply module 800, described in detail hereinafter, and emits the close signal if proper condition exists when a request for 120V AC power is made. Unless these conditions exist, power will not be supplied to power outlet 516.

Data transfer circuit 532 inputs control communications signals from control communications wires 32, which will typically be in digital form. These control communications signals correspond to the low speed digital data described in U.S. Pat. No. 4,899,217. The contents of this patent are incorporated by reference into this disclosure. This patent describes the type of control system that can be used with data transfer circuit 532.

Data transfer circuit 532 can output control communications signals received to control communications outlet 514 so that they are input into an appliance connected to the receptacles 510 and also output control communications signals from the appliance to ribbon cable 22.

Data transfer circuit 532 could receive highly complex communication inputs, or very basic inputs and the construction of data transfer circuit 532 will depend on the sophistication of the system.

Also illustrated in FIG. 5D is the direct connection established between telephone line 28 and telephone line 30 and telecommunications outlet 512. Thus, an output for telephone communications exists in duplex power and communications module 500.

Figure 6A:
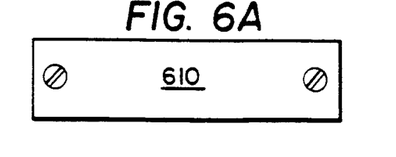
FIGS. 6A-6C illustrate the lighting power module of the integrated outlet according to the present invention.
Figure 6B:
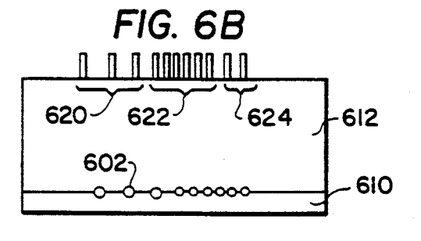
Figure 6C:
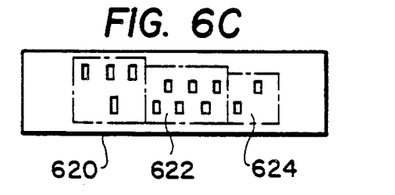

FIGS. 6A-6C illustrate the front, top, and back view of lighting power module 600. As shown in FIGS. 6B and 6C, pins 620, 622, and 624 correspond to pins 520, 522, and 524, respectively.

Lighting power module 600 operates electrically like duplex power and communications module 500, but rather than having receptacles 510 that allows the plug in of an appliance, outputs the power and control communications signals to external wiring such as lighting ribbon cable 602 shown in FIGS. 2 and 6B. It should be noted that although the this module is termed a "lighting" power module, it can be used to control any type of device that will typically be hardwired to power or communications.

FIG. 6A illustrates a front plate 610 that attaches, preferably with screws, the housing 612 of lighting power module 600, both of which are preferably made of molded plastic. Lighting ribbon cable 602 is disposed between front plate 610 and housing 612 and electrical contact to lighting ribbon cable 602 is established similarly as that described with reference to tap 40 in FIG. 3. Lighting ribbon cable 602 can then be run to an external outlet for communications, power, or telecommunications.

Dimming capability, obtained by varying the 120V AC power output, can be obtained by substituting a triac or electronic thryistor for the relay 530 shown in FIG. 5D. Control signals can then control the triac or electronic thryistor. This same triac or thryistor could be substituted for relay 530 in FIG. 5D to obtain a dimming receptacle. However, this functionality, which would allow, for instance, a dimming table lamp to be plugged into the receptacle, would cause confusion between receptacles not containing the dimming function. Thus, this feature has not been incorporated into the preferred embodiment.

In the embodiment shown, telecommunications signals from telephone line 28 and telephone line 30 shown in FIG. 4 are not transferred to lighting ribbon cable 602, but, if desired, this could be done.

Figure 7A:
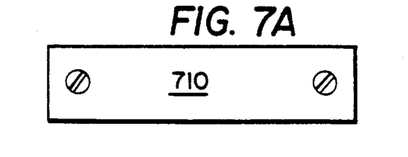
FIGS. 7A-7C illustrate the switch/sensor module of the integrated outlet according to the present invention.
Figure 7B:
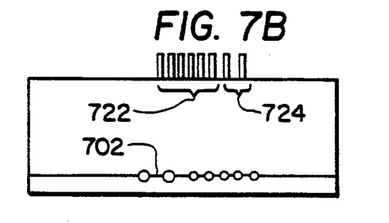
Figure 7C:
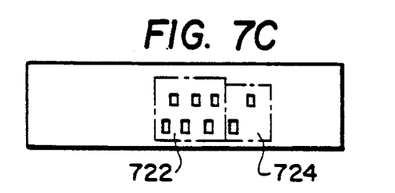

FIGS. 7A-7C illustrate the front, top, and back views of switch/sensor module 700. Switch/sensor module 700 operates like lighting power module 600, except that it cannot receive 120V AC power. Thus, as shown in FIGS. 7B and 7C, only control communication pins 722 and DC power pins 724 are used for attachment to ribbon cable 22. Switch/sensor module 700 is used for switches that can control lighting, ceiling fans, or many other appliances, and also for various types of sensors. Because 120V AC power cannot be received, a much safer environment is obtained because frequently used switches attached through switch/sensor module 700 cannot develop a 120V AC short.

FIG. 7A illustrates that front plate 710 and housing 712 are identical in function to front plate 610 and housing 612 shown in FIGS. 6A and 6B and establish electrical connection with external wiring such as switch/sensor ribbon cable 702, which is shown in FIGS. 2 and 7B. Switch/sensor ribbon cable 702 can then be run to switches or sensors or other appliances not requiring 120V AC power as necessary.

Figure 8A:
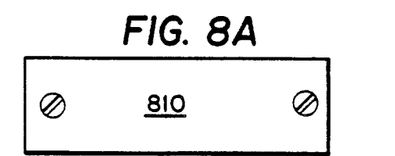
FIGS. 8A-8D illustrate the uninterruptable power supply module of the integrated outlet according to the present invention.
Figure 8B:
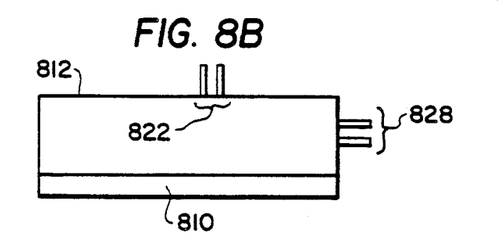
Figure 8C:
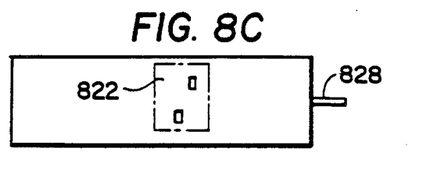

The front, top, and back views shown in FIG. 8A-8C of uninterruptable power supply module 800 show that a front plate 810 covers an open front of housing 812. 12V DC power pins 822 input 12V DC power from ribbon cable 22 and 5V DC power is output to pins 828 so that 5V DC power can be supplied to the other modules. Only these pins are necessary because the only purpose of uninterruptable power supply module 800 is to provide constant 5V DC power to data transfer circuit 532 or its equivalent in switch/sensor module 700 and lighting power module 600. However, if ribbon cable 22 contains a lower DC voltage or if the other modules were of such simple construction that they did not require external power for their operation, uninterruptable power supply module 800 could be eliminated.

Uninterrupted power exists because the 12V DC line has attached to it at some point a rechargeable battery that supplies 12V DC power in case of a power failure to the 12V DC generator.

Figure 8D:
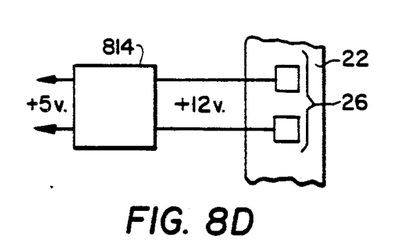
Figure 9A:
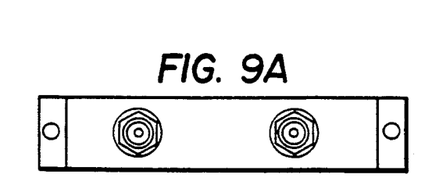
FIGS. 9A-9C illustrate the coaxial tap of the integrated outlet according to the present invention.
Figure 9B:
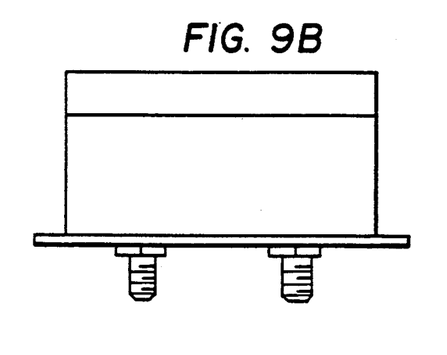
Figure 9C:
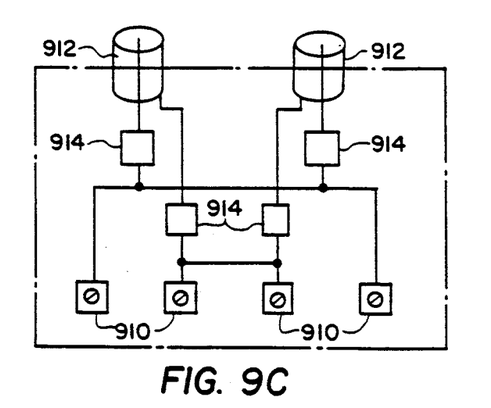

FIG. 8D illustrates that uninterruptable power supply module 800 contains a 12V DC to 5 V DC convertor 814. Convertor 814 could also be made to convert voltages higher or lower than 12V DC to some voltage other than 5V DC. Such a convertor is well known. However, the placement of convertor 814 in a separate unit that will only supply 5V DC power to modules that are located very close to uninterruptable power supply module 800 further contributes to the safety of the integrated outlet 20. FIGS. 9A-9C illustrate the coaxial tap 900 that allows the output of the signal transmitted along the coaxial wire 34 of ribbon cable 22 shown in FIG. 4. Due to the difficulty of inserting pins into coaxial wire 34 and still having desired dielectric properties, connection of coaxial wire 34 to coaxial tap 900 requires cutting coaxial wire 34, exposing the ends of each conductor, and attaching the exposed ends to coaxial tap 900. FIG. 9C shows an attachment to screws 910, although other types of attachments could be made. With proper attachment, the transmitted signal will be output through coaxial outlets 912 and also continue along coaxial wire 34 of ribbon cable 22.

Passive transformers 914 disposed in the electrical path within coaxial tap 900, as shown in FIG. 9C, perform the function of signal attenuation and prevents signal reflection from the connector when no device is plugged into outlets 912.

Figure 10A:
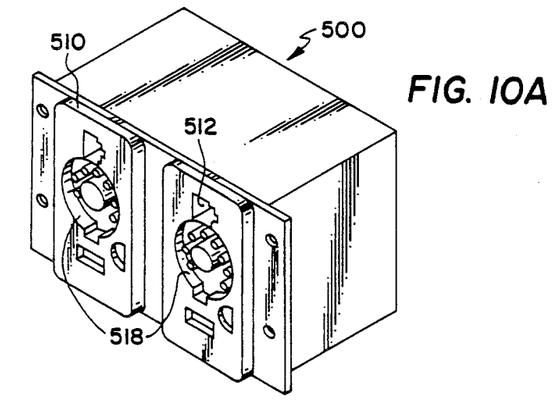
FIGS. 10A-10B illustrate another embodiment of the duplex power and communication receptacle of the integrated outlet according to the present invention.
Figure 10B:
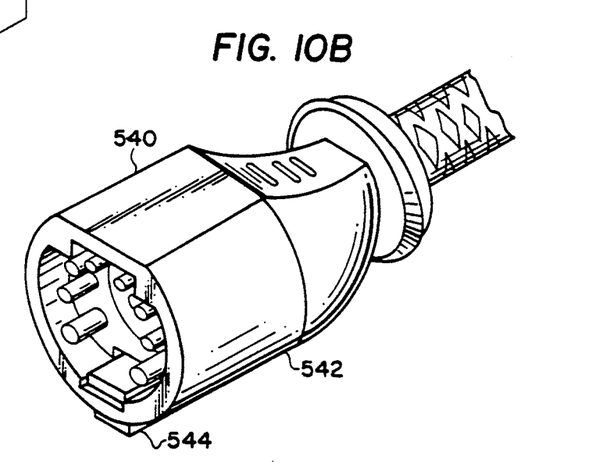

FIG. 10 illustrates an alternate embodiment for receptacles 510 of duplex power and communications module 500 that were shown in FIG. 5A. In the alternate embodiment, receptacles 510 contains a telecommunications outlet 512 that allows the insertion of a standard telephone extension cord. The combination power and command communications outlet 518 is adapted for a plug 540 shown in FIG. 10B that can be easily and exactly inserted. This is especially advantageous in hard to reach locations, such as behind a bookcase, and also for handicapped people. Furthermore, alignment of plug 540 requires alignment of plug outer housing 542, due to projecting portion 544, the individual pins can be made smaller than normally, and, therefore, at a lower cost.

Figures 11A, 11B:
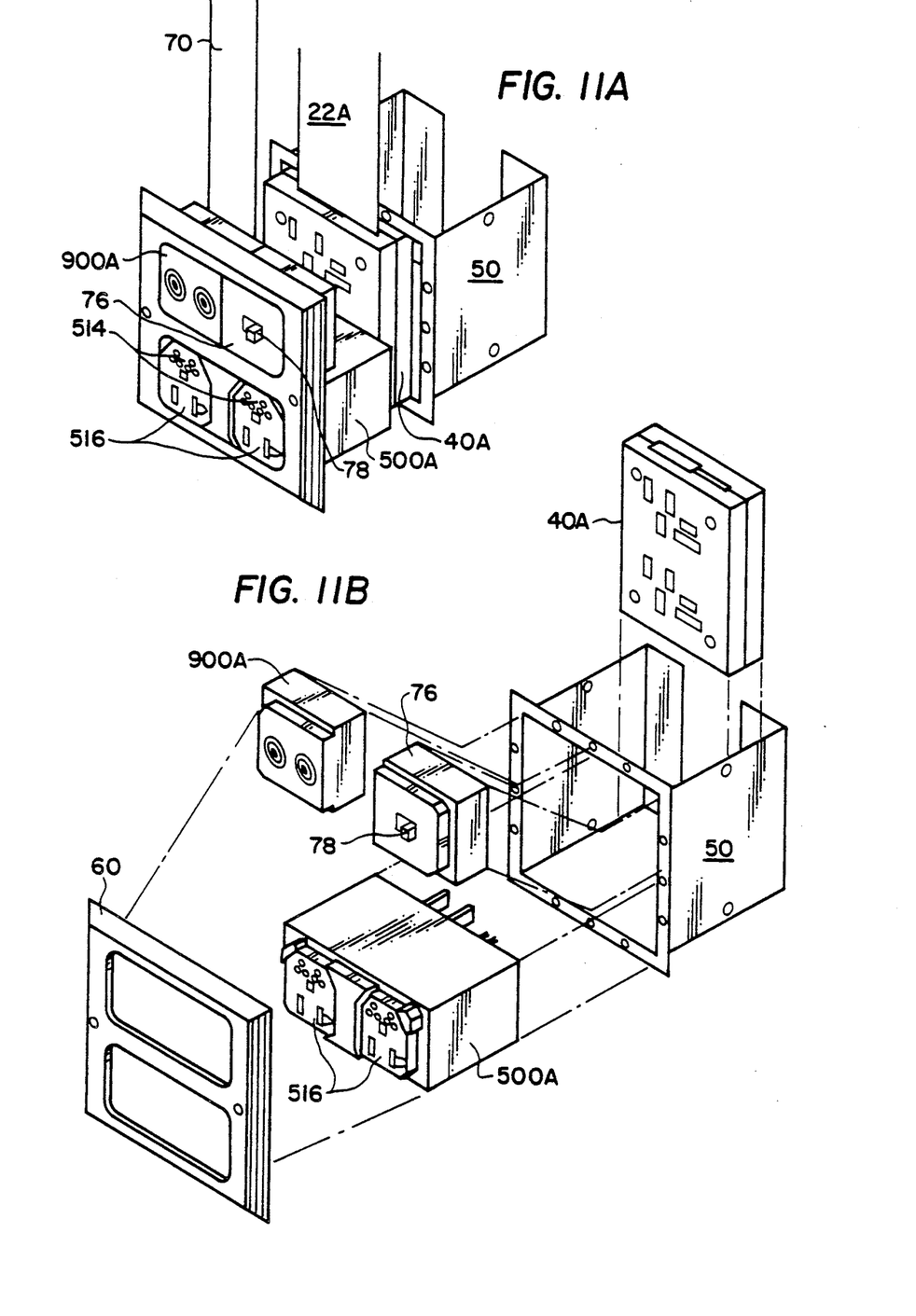
FIGS. 11A-11C illustrate a second embodiment of integrated outlet according to the present invention.

FIG. 11A illustrates a second embodiment of integrated outlet 20, labelled outlet 20A, which uses corresponding labelling for similar parts. Parts that have notable differences are labelled with the same number and a prefix "A" or an entirely new number.

The most significant distinction in integrated outlet 20A is that signals to the outlet arrive via two different cables, cable 22A and cable 70, which are described in greater detail in Ser. No. 07/464,131 now U. S. Pat. No. 5,043,531 issued Aug. 27, 1991.which is expressly incorporated by reference.

Figure 11C:
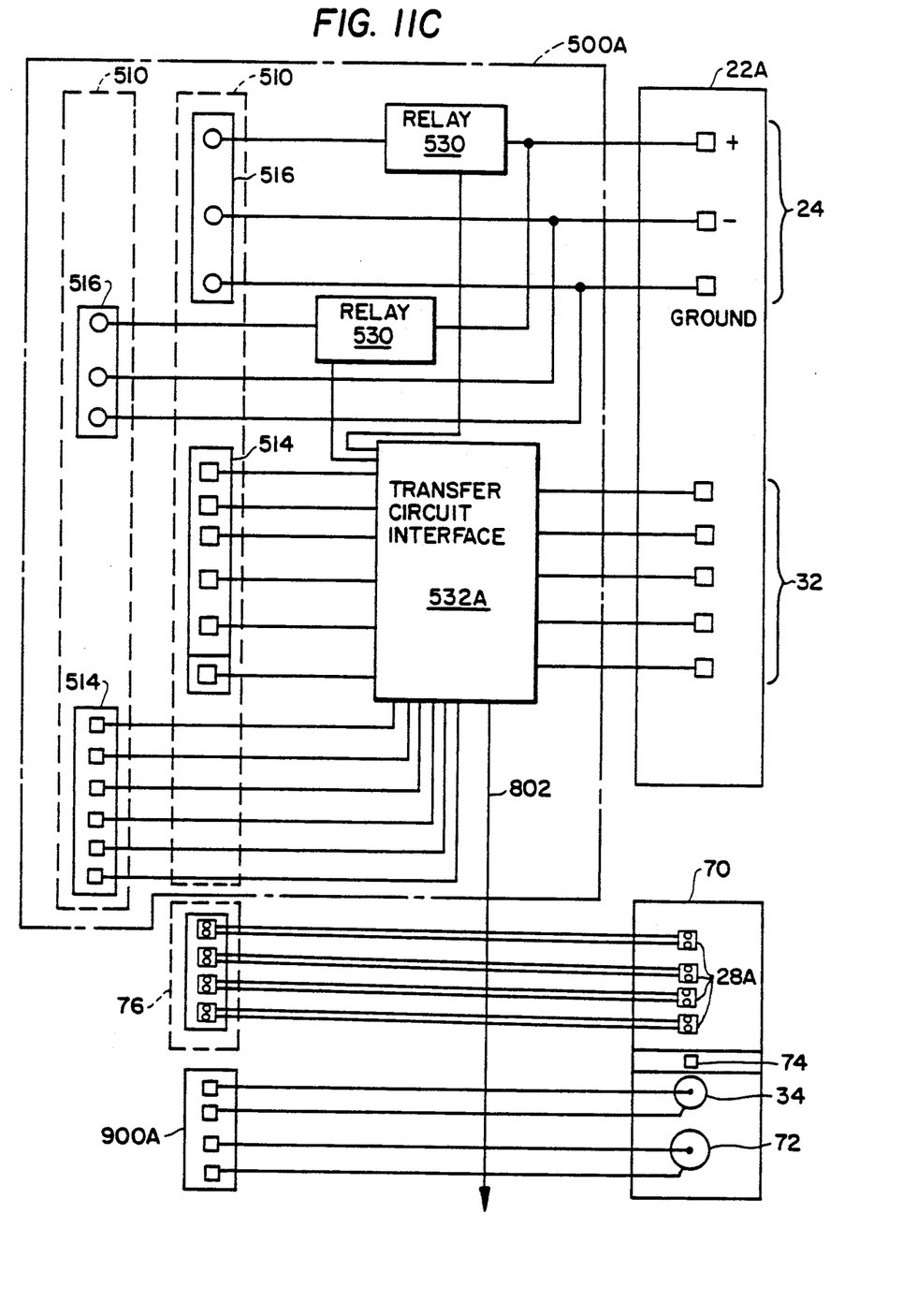

Cable 22A, shown in block form in FIG. 11C is similar to cable 22, except it is smaller because the coaxial cable 34, telecommunications conductor pairs 28 and 30, and DC conductors 26 have been eliminated. It has been determined that cable 22A is more efficient and easier to install that the previously described cable 22.

A second cable 70, also shown in block form in FIG. 11C, contains the coaxial cable 34 and four telecommunications conductor pairs 28A, as well as an additional coaxial cable 72 and optionally an optical fiber 74. Telecommunications conductor pairs 28A each use twisted wire pairs. The isolation of the conductors in cable 70 from the conductors in cable 22A increases the signal to noise ratio during the transfer of signals in cable 70, which significantly improves performance.

The two cables 22A and 70 still share a common integrated outlet 20A. As illustrated in FIG. 11A and in expanded view in FIG. 11B, tap 40A holds cable 22A, into which the various modules are inserted. Lighting power module 600 and switch/sensor module 700 operate in the same manner as those previously described, and can be connected to tap 40A in the same manner as illustrated in FIG. 2.

Duplex power and communications module 500A no longer contains telecommunications outlet 512. Rather telecommunications module 76 is separated from the duplex power and communications module and disposed adjacent to coaxial tap module 900A. Telecommunication module 76 has outlet conductors directly connected to twisted wire pairs 28A. Each of the eight outlet conductors are then disposed in a telecommunications outlet 78, illustrated in FIG. 11A, that allows insertion of a standard telecommunications plug.

For further modulairty it is desired that lighting power module 600, switch/sensor module 700, and duplex power and communications module 500A all have the capacity to input AC power from power conductors 44 and have an internal AC/DC convertor within the respective module to power the electronics, such as transfer circuit 532 illustrated in FIG. 11C. It is important to note, however, that switch/sensor module 700 will not output this AC power and light power module 700 will only output AC power when the previously described condition for closed loop power are met.

Lighting power module 600 and switch/sensor module 700 are easily connected to tap 40A, even when a duplex power and communications module 500A is used because both coaxial tap module 900A and telecommunications module 76 do not contact tap 40A, but rather leave a large space between the back of each module and the front face of tap 40A.

Each of the modules are also slidably insertable into housing 50, each module insertable into the illustrated location. With this arrangement, the modules are located in a positional relationship with respect to one another that allows for the most efficient installation of the cables 22A and 70 into the integrated outlet 20A.

FIG. 11C illustrates the electrical paths that exist within duplex power and communications module 500A, telecommunications module 76, and coaxial tap module 900A. It should be noted that with the configuration now illustrated in FIG. 11C and also in FIG. 5 that the address for each control communications outlet 514 can be determined within transfer circuit interface 532.

While the invention has been described in connection with what is presently considered to be the most practical and preferred embodiments, it is understood that the invention is not limited to the disclosed embodiment, but, on the contrary, is intended to cove various modifications and equivalent arrangements included within the spirit and scope of the appended claims.

What is claimed is:

1. An integrated apparatus for establishing electrical connections with at least one of an appliance having an AC power cord, communication wiring and an appliance plug to a first ribbon cable containing AC power conductors and command communications conductors that trasmit AC electrical power and command communications signals that include predetermined relay signals and establishing electrical connection with a telecommunications device having a telecommunications cord and telecommunications plug to a second cable including telecommunications conductors, comprising:
   a housing;
   means for holding said first ribbon cable disposed in said housing and having a front face;
   first modular interface means, disposed in said housing and contacting said front face of said holding means, for establishing electrical contact from said AC conductors and said command communication conductors of said first ribbon cable disposed in said holding means to said appliance, said first modular interface means including:

outlet means containing electrical contacts adaptable for insertion of said appliance plug, and relay means for completing an electrical path between said AC conductor and said outlet means upon receipt of one of said predetermined relay signals; and second modular interface means, disposed in said housing and to electrically connected to said first ribbon cable disposed in said holding means, for establishing electrical contact with said telecommunications conductors in said second cable to said telecommunications device, said second modular interface means including telecommunications outlet means adaptable for insertion of said telecommunications plug.

2. An apparatus according to claim 1 wherein said outlet means of said first modular interface means and said telecommunications outlet means of said second modular interface means are disposed in substantially the same plane, an empty space exists between a rear face of said second modular means and said front face of said holding means, and said second cable is terminated within said space to said second modular means.

3. An apparatus according to calim 2 wherein said first modular interface means and said second mdoular interface means are disposed in side by side relation.

4. An integrated apparatus for establishing electrical connections with at least one of an appliance having an AC power cord, communication wiring and an appliance plug to a first ribbon cable containing AC power conductors and command communications conductors that transmit AC electrical power and command communications signals that include predetermined relay signals, establishing electrical connection with a telecommunications device having a telecommunications cord and telecommunications plug to a second cable including telecommunications conductors, and for establishing electrical connection with a communications device having a device coaxial cable and coaxial plug to a coaxial conductor disposed within said second cable, comprising:

a housing;

means for holding said first ribbon cable disposed in said housing and having a front face;

first modular interface means, disposed in said housing and contacting said front face of said holding means, for establishing electrical contact from said AC conductors and said command communication conductors of said first ribbon cable disposed in said holding means to said appliance, said first modular interface means including:

outlet means containing electrical contacts adaptable for insertion of said appliance plug, and relay means for completing an electrical path between said AC conductors and said outlet means upon receipt of one of said predetermined relay signals;

second modular interface means, disposed in said housing and not electrically connected to said first ribbon cable disposed in said holding means, for establishing electrical contact with said telecommunications conductors in said second cable to said telecommunications device, said second mdoular interface means including telecommunications outlet means adaptable for insertion of said telecommunications plug; and third modular interface means, disposed in said housing and not electrically connected to said first ribbon cable disposed in said holding means, for establishing electrical contact with said device coaxial conductor in said second cable to said communications device, said third modular interface means including coaxial outlet means adaptable for insertion of said coaxial plug.

5. An apparatus according to claim 4 wherein said outlet means of said first modular inteface means, said telecommunications outlet means fo said second modular interface means, and said coaxial outlet means of said third modular interface means are disposed in substantially the same plane, an empty space exists between rear faces of said second and third modular means and said front face of said holding means and said second cable is terminated within said space to said second and third modular means.

6. An apparatus according to calim 5 wherein said first, second and third modular interface means are disposed in adjacent relation.

7. An apparatus according to calim 5 wherein second and third modular interface means are disposed side by side.

8. An integrated apparatus for establishing electrical connections with at least one of an appliance having an AC power cord, communication wiring and an appliance plug to a first ribbon cable containing AC power conductors and command communications conductors that transmit AC electrial power and command communications signals, and for establishing electrical connection with a telecommunications device having a telecommunications cord and telecommunications plug to a second cable including telecommunications conductors comprising:

a housing;

means for holding said first ribbon cable disposed in said housing and having a front face;

first modular interface means, disposed in said housing and contacting said front face of said holding means and establishing electrical contact with said AC conductors and said command communication conductors of said first ribbon cable disposed in said holding means, for establishing electrical contact from said AC conductors to said appliance, said first modular interface means including outlet means containing electrical contacts adaptable for insertion of said appliance plug; and second modular interface means, disposed in said housing and not electrically connected to said first ribbon cable disposed in said holding means, for establishing electrical contact with said telecommunications conductors in said second cable to said telecommunications device, said second mdoular interface means including telecommunications outlet means adaptable for insertion of said telecommunications plug.

9. An apparatus according to claim 8 wherein said outlet means of said first modular interface means and said telecommunications outlet means of said second modular inteface means are disposed in substantially the same plane, an empty space exists between a rear face of said second mdoular means and said front face of said holding means, and said second cable is terminated within said space to said second modular means.

10. An apparatus according to claim 9 wherein said first modular interface means and said second modular interface means are disposed in side by side relation.

* * * * *